3,163,647
VINYL s-TRIAZINES, METHOD OF PREPARING THE SAME AND POLYMERS DERIVED THEREFROM
Frederic C. Schaefer, Darien, and Joseph J. Pellon, New Canaan, Conn., assignors to American Cyanamid Company, New York, N.Y., a corporation of Maine
No Drawing. Filed Nov. 10, 1960, Ser. No. 68,368
6 Claims. (Cl. 260—248)

This invention relates to novel chemical compounds and to a process for preparing the same.

More particularly, the present invention is concerned with substituted-s-triazines which may be represented by the structural formula:

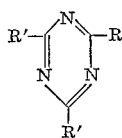

in which R is a lower alkenyl radical and R' is selected from the group consisting of lower alkenyl radicals, lower alkyl radicals and halogen-substituted lower alkyl radicals. Moreover, the R' substituent at the 4-position may be the same or different from the R' radical found in the 6-position.

Still more particularly, the present invention relates to homopolymers of such substituted s-triazines as represented by the structural formula hereinabove and interpolymers of such substituted s-triazines with other monomers or unsaturated polyesters having excellent heat-resistance and many other useful properties.

Even more particularly, the present invention relates to a method for preparing substituted s-triazines of the structural formula represented hereinabove by pyrolysis of the corresponding 1-acetoxyalkyl s-triazines so as to yield the products of the present invention.

By "lower alkenyl" as is used herein is meant an unsaturated radical which may be considered to be derived from ethylene or isopropylene and, more specifically, an ethenyl or vinyl or an isopropenyl radical.

By "lower alkyl" as is employed herein is meant a saturated aliphatic hydrocarbon radical having from one to four carbon atoms, e.g. methyl, ethyl, propyl, isopropyl, butyl, isobutyl and sec-butyl.

Suitable "halogen substituted lower alkyl" radicals are trichloromethyl, tribromomethyl, trifluoromethyl, pentachloroethyl, pentabromoethyl, pentafluoroethyl, heptachloropropyl, heptabromopropyl, heptafluoropropyl and the like.

Moreover, the R' radical at the 4-position may be the same or different from the R' radical found in the 6-position.

A non limiting list of typical substituted s-triazines embraced by the structural formula hereinabove is: 2,4-dimethyl-6-vinyl-s-triazine, 2,4-diethyl-6-vinyl-s-triazine, 2,4-dipropyl-6-vinyl-s-triazine, 2,4-diisopropyl-6-vinyl-s-triazine, 2,4-dibutyl-6-vinyl-s-triazine, 2,4-diisobutyl-6-vinyl-s-triazine, 2,4-dimethyl-6-isopropenyl-s-triazine, 2,4-diethyl-6-isopropenyl-s-triazine, 2,4-dipropyl-6-isopropenyl-s-triazine, 2,4-diisopropyl-6-isopropenyl-s-triazine, 2,4-dibutyl-6-isopropenyl-s-triazine, 2,4-diisobutyl-6-isopropenyl-s-triazine, 2,4-divinyl-6-methyl-s-triazine, 2,4-divinyl-6-ethyl-s-triazine, 2,4-divinyl-6-propyl-s-triazine, 2,4-divinyl-6-isopropyl-s-triazine, 2-butyl-4,6-divinyl-s-triazine, 2,4-divinyl-6-isobutyl-s-triazine, 2,4-diisopropenyl-6-methyl-s-triazine, 2,4-diisopropenyl-6-ethyl-s-triazine, 2,4-diisopropenyl-6-propyl-s-triazine, 2,4-diisopropenyl-6-isopropyl-s-triazine, 2-butyl-4,6-diisopropenyl-s-triazine, 2,4-diisopropenyl-6-isobutyl-s-triazine, etc., 2,4,6-trivinyl-s-triazine, 2,4,6-triisopropenyl-s-triazine, etc., 2,4-bis(trichloromethyl)-6-vinyl-s-triazine, 2,4-bis(tribromomethyl)-6-vinyl-s-triazine, 2,4-bis(trifluoromethyl)-6-vinyl-s-triazine, 2,4-bis(pentachloroethyl)-6-vinyl-s-triazine, 2,4-bis(pentabromoethyl)-6-vinyl-s-triazine, 2,4-bis(pentafluoroethyl)-6-vinyl-s-triazine, 2,4-bis(heptachloropropyl)-6-vinyl-s-triazine, 2,4-bis(heptabromopropyl)-6-vinyl-s-triazine, 2,4-bis(heptafluoropropyl)-6-vinyl-s-triazine, etc., 2,4-bis(trichloromethyl)-6-isopropenyl-s-triazine, 2,4-bis(tribromomethyl)-6-isopropenyl-s-triazine, 2,4-bis(trifluoromethyl)-6-isopropenyl-s-triazine, 2,4-bis(pentachloroethyl)-6-isopropenyl-s-triazine, 2,4-bis(pentabromoethyl)-6-isopropenyl-s-triazine, 2,4-bis(pentafluoroethyl)-6-isopropenyl-s-triazine, 2,4-bis(heptachloropropyl)-6-isopropenyl-s-triazine, 2,4-bis(heptabromopropyl)-6-isopropenyl-s-triazine, 2,4-bis(heptafluoropropyl)-6-isopropenyl-s-triazine, etc.

Several s-triazines having an unsaturated radical as a substituent on the triazine nucleus, e.g., 2-vinyl-s-triazine, 2-allyl-s-triazine, and 2-isopropenyl-s-triazine, have been disclosed. In addition, acryloguanamine and methacryloguanamine are known. For example, alpha,beta-unsaturated esters and unsaturated monocarboxylic acid halides have been reacted with biguanides to produce alpha,beta-unsaturated guanamines. Also, cyanuric halides have been condensed with salts of unsaturated monocarboxylic acids to yield acryloxytriazines. Such known methods, however, are not adaptable for the preparation of substituted s-triazines of the structural formula represented hereinabove in view of the difficult and time-consuming preparative steps which are required. Recently, in U.S. Patent 2,845,422, isued to F. C. Schaefer and G. A. Peters, the conversion of 2-(beta-hydroxyethyl)-s-triazine to 2-vinyl-s-triazine by dehydration with acetic anhydride is reported, as is also the conversion of 2-(beta-acetoxyethyl)-s-triazine to 2-vinyl-s-triazine at room temperature. Because of the ease of hydrolysis of 2-vinyl-s-triazine, however, substantially little interest in this compound has developed. It has now been discovered that s-triazine compounds wherein the 4- and 6-positions of the s-triazine nucleus contain substituents as enumerated hereinabove for R' renders the novel tri-substituted s-triazine compounds markedly more stable toward hydrolysis than 2-vinyl-s-triazine. Additionally, the novel homopolymers and novel interpolymers prepared therefrom display extremely useful properties.

It has now been discovered that substituted s-triazines of the formula as represented hereinabove may be readily prepared by pyrolysis of the respective (1-acetoxyalkyl)-s-triazine, i.e. (1-acetoxyethyl)-s-triazine or (1-acetoxyisopropyl)-s-triazine. The acetates are easily obtained by acetylation of a suitable (1-haloethyl)-s-triazine or (1-haloisopropyl)-s-triazine with an excess of an alkali metal acetate in dry acetic acid. The course of the reaction is believed to proceed substantially as depicted below wherein 2-(1-chloroethyl)-4,6-dimethyl-s-triazine and sodium acetate are utilized for illustrative purposes.

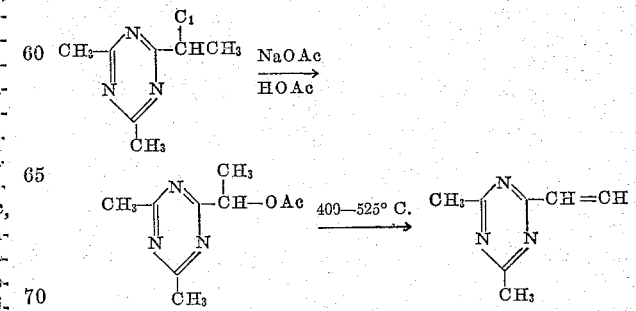

Thus at elevated temperatures, usually within the temperature range of from about 400° to about 525° C. and, preferably, at temperatures of 450° to 475° C., (1-acetoxyethyl) - s-triazines and (1-acetoxyisopropyl)-s-triazines may be pyrolyzed to obtain good yields of products as represented by the structural formula hereinabove. The products thus obtained are easily and efficiently recovered by fractionation or other conventional method of separation. Advantageously, little, if any, formation of tars and undesirable side-reactions are evident by this vapor-phase method which affords conversions of from about 50 to about 80% of the starting s-triazine.

The pyrolysis reaction may be carried out in any suitable pyrolytic chamber, furnace, tube or the like which will afford proper control of the temperature. The chamber or reaction column or tube may be made of any suitable material, as, for example, thermally resistant glass, quartz or other non-corrosive material. The starting material is introduced into the reaction chamber in the form of vapors which may then be carried through the heated zone by means of an inert, diluent gas, as, for example, carbon dioxide, nitrogen, steam or by means of a vacuum at the exit end of the reaction chamber, or by means of pressure at the entrance end of the chamber or by means of gravity flow.

The pyrolysis will proceed satisfactorily in an unpacked tube, but a packed tube containing glass Raschig rings, glass wool, glass chips, glass beads, porous plate and the like which have the effect of increasing heat transfer may also be employed. If desired, a conditioning furnace or chamber may be used as a preheater to vaporize the (1-acetoxyethyl)-s-triazine or (1-acetoxyisopropyl)-s-triazine in order to bring the vapors to within approximately 50–100° C. of the specified reaction temperatures. Alternatively, an acetic acid solution of the s-triazine may be fed to the pyrolytic reaction chamber.

The temperature of the pyrolysis chamber may vary from about 400° to about 525° C. In general, however, temperatures within the range of 450° to 475° C. are more desirable and are preferred. Contact times within these temperature ranges from about 10 seconds to 30 seconds at one atmosphere in a void space of 50 cubic centimeters have been employed with good success. The pyrolysis chamber, furnace, tube or the like is usually heated by external means.

The pyrolytic reaction may be generally conducted at substantially atmospheric pressure within the reaction chamber. In some instances, however, the reaction may be conducted at a pressure substantially less, and in other instances at a pressure significantly greater than atmospheric pressure within the pyrolysis chamber without noticeably affecting the overall yield.

The alkenyl-s-triazine and acetic acid are readily separated from the unchanged acetate by distillation and the recovered acetate is recycled to the system so as to improve the yield of the resultant s-triazine. The work-up of the acetic acid-s-triazine mixture is readily accomplished by diluting the mixture with a suitable diluent such as methylene chloride or petroleum ether thus dissolving the alkenyl-s-triazine product and washing the acid out with a small volume of water to which a base such as sodium carbonate or the like has been added. Generally, separation by distillation is not completely satisfactory for the complete removal of acetic acid because of the tendency toward salt formation with the weakly basic alkenyl-s-triazine whereby volatility of acetic acid is reduced. During the distillation of the alkenyl-s-triazine it is frequently desirable to add to the distillation apparatus a suitable polymerization inhibitor or stabilizer such as hydroquinone, phenyl-2-naphthyl amine, and the like, in order to forestall spontaneous polymerization of the alkenyl-s-triazine compound.

The starting material which is subsequently acetylated with an alkali metal acetate, a (1-haloalkyl)-s-triazine, such as (1-haloethyl)-s-triazine and (1-haloisopropyl)-s-triazine, is readily obtained by the methods disclosed and claimed in copending application Serial No. 12,930, filed March 7, 1960, and in copending application Serial No. 68,369, filed concurrently herewith, now U.S. Patent No. 3,062,818.

The monomeric compounds obtained by this process polymerize readily in the presence of a small quantity of a catalyst to give homopolymers which possess properties which make them useful as components of films, fibers, and coatings and as dispersing agents. In a similar manner, these monomers can be admixed with other monomeric materials in the presence of catalyst and at elevated temperatures to give interpolymers which possess many useful properties, including heat-resistance.

Among the monomers which can be polymerized with the novel alkenyl-s-triazine compounds of this invention there may be mentioned the following: methyl acrylate, ethyl acrylate, butyl acrylate, isobutyl acrylate, methyl methacrylate, styrene, vinyltoluene, acrylic acid, methacrylic acid, vinyl ethers, vinyl ketones, vinyl pyridines, acrylonitrile, vinylidene chloride, polymerizable unsaturated alkyd resins, e.g., ethylene glycol maleate, diethylene glycol maleate phthalate and the like, and in general any monomeric compound capable of polymerization and containing a $CH_2=C<$ group.

Included among the catalysts which may be utilized to prepare either the homopolymers or interpolymers obtainable from the novel monomers of this invention are the following: benzoyl peroxide, methyl ethyl ketone peroxide, acetyl peroxide, lauroyl peroxide, and ditertiary butyl peroxide. Similarly, azo compounds may be used as polymerization catalysts, as may actinic light. Radox catalyst systems as, for example, solutions of sodium bromate, sodium sulfite and the like can also be employed. The quantity of catalyst utilized can be varied considerably. However, in most instances, it is desirable to utilize from about 0.1 percent to about 2 percent based on total weight of the monomer or monomers.

The polymerization can be carried out in mass, that is, simply by heating the monomer or monomers in the presence of a catalyst, or if desired, the polymerization can be conducted in a solvent for the monomer or monomers, or in an aqueous emulsion. Chain-modifying agents or chain terminators, such as the mercaptans, and particularly dodecyl mercaptan, and other additives conventionally utilized in polymerization reactions can be employed.

The following examples illustrate in detail the preparation of the novel s-triazines of the present invention from the corresponding (1-acetoxyalkyl)-s-triazine and the homopolymers and interpolymers prepared by the polymerization of such monomers.

EXAMPLE 1

*Preparation of 2,4-Dimethyl-6-Vinyl-s-Triazine*

(A) *2(1 - acetoxyethyl)-4,6-dimethyl-s-triazine.*—2-(1-chloroethyl)-4,6-dimethyl-s-triazine obtained by the reaction of 2-chloropropionamidine hydrochloride with ethyl acetimidate, B.P. 99–102° C. at 24 mm., is utilized in this example.

A mixture of 155 g. (0.90 mole) of 2-(1-chloroethyl)-4,6-dimethyl-s-triazine, 106 g. (1.3 moles) of anhydrous sodium acetate, and 155 cc. of glacial acetic acid is refluxed for 18 hours. After filtration, the product solution is distilled to separate the acetate from unconverted starting material. The product boils at 135° C. at 29 mm., $n_D^{29}$ 1.4696. Approximately 24 percent of the starting chloride is recovered and the yield of 2-(1-acetoxyethyl)-4,6-dimethyl-s-triazine is 67 percent, based upon the converted starting material.

(B) *2,4-dimethyl-6-vinyl-s-triazine.*—The pyrolysis of the 1-acetoxyethyl-4,6-dimethyl-s-triazine prepared in A above is carried out in a one-inch diameter Pyrex glass tube mounted vertically and packed to a depth of 16 inches with 6 mm. Pyrex glass beads. The tube is heated to 450–460° C. over a length of 12 inches by an electric furnace. The liquid acetate is added dropwise at a flow rate of 0.6 per minute to the top of the column and the product is collected in a cold receiver at the bottom. A slow stream of nitrogen is passed through the apparatus continuously. Conversion of the starting ester is about 50 percent. The pyrolysis product mixture is then distilled through a simple still to separate acetic acid and 2,4-dimethyl-6-vinyl-s-triazine from unchanged 2 (1-acetoxyethyl)-4,6-dimethyl-s-triazine.

The acetic acid-2,4-dimethyl-6-vinyl-s-triazine mixture is neutralized with aqueous potassium carbonate in the presence of ether. Re-extracting the aqueous phase with ether, drying the ether solution with anhydrous potassium carbonate and rapid fractional distillation at low temperature affords a good yield of 2,4-dimethyl-6-vinyl-s-triazine boiling at 73–5° C./19 mm., $n_D^{29}$ 1.5014. The product which polymerizes spontaneously at room temperature is stabilized by the addition of hydroquinone and stored at low temperature for subsequent polymerization.

EXAMPLE 2

*Preparation of 2,4-Diethyl-6-Vinyl-s-Triazine*

(A) *2-(1-acetoxyethyl)-4,6-diethyl - s - triazine.*—One hundred and twenty-two grams (0.50 mole) of 2-(1-bromoethyl)-4,6-diethyl-s-triazine, obtained by the bromination of 2,4,6-triethyl-s-triazine, is refluxed with 125 cc. of glacial acetic acid, 10 cc. of acetic anhydride, and 61.5 g. (0.75 mole) of anhydrous sodium acetate for eighteen hours. The reaction mixture is then cooled and mixed with 0.10 mole of sodium iodide, and the mixture is heated for 30 minutes at 90–100° C. to reduce unchanged starting bromide to triethyl-s-triazine. The reaction mixture is then cooled, diluted with water, treated with sodium sulfite to remove iodine and neutralized with sodium carbonate. The product is extracted with ether, dried with calcium chloride and distilled. The product acetate boils at 143° C. at 22 mm.; $n_D^{27.5}$ 1.4667. The yield of essentially pure material is 75 g. or 67 percent.

(B) *2,4-diethyl-6-vinyl-s-triazine.*—2 - (1-acetoxyethyl)-4,6-diethyl-s-triazine is pyrolyzed using the same apparatus and technique as described for the preparation of 2,4-dimethyl-6-vinyl-s-triazine. At 450–470° C. and a flow rate of 0.4 g. per minute, 187 g. of pyrolyzate was recovered from 191 g. of starting material. The acetic acid content of the pyrolyzate indicated 80 percent conversion and fractional distillation of the product after several extractions with sodium carbonate produced a material having the following physical properties: B.P. 101–102° C. at 19 mm.; $n_D^{26}$ 1.4925; freezing point 12° C.

EXAMPLE 3

*Preparation of 2,4-Bis-(Trifluoromethyl)-6-Vinyl-s-Triazine*

(A) *2-(1-acetoxyethyl)-4,6-bis(trifluoromethyl)-s-triazine.*—A mixture of 68.5 grams (0.24 mole) of 2-(1-chloroethyl)-4,6-bis(trifluoromethyl)-s-triazine, obtained by the reaction of 2-chloropropionamidine hydrochloride with trifluoroacetamidine, 40 grams (0.48 mole) of anhydrous sodium acetate, 30 cc. of acetic acid and 3 cc. of acetic anhydride is refluxed with stirring for six hours. After cooling, the reaction mixture is extracted with ether repeatedly. The ether extract is evaporated and the residue distilled. 2-(1-acetoxyethyl)-4,6 - bis - (trifluoromethyl)-s-triazine is obtained as a fraction boiling at about 93° C. at 18 mm.

(B) *2,4-bis(trifluoromethyl)-6-vinyl - s - triazine.*—The pyrolysis of the acetate was carried out in the manner described for the preparation of 2,4-dimethyl-6-vinyl-s-triazine. The observed temperature was 420–430° C. and the rate of flow was 0.4 g. per minute. The acetate is introduced to the head of the pyrolysis tube as a melt from a heated dropping funnel. The crude pyrolyzate is distilled rapidly to separate a mixture of vinyl compound and acetic acid from unconverted acetate. The vinyl-s-triazine-acetic acid mixture is diluted with petroleum ether and neutralized with aqueous sodium carbonate. The organic phase is then dried with calcium chloride and distilled, employing hydroquinone as an inhibitor. The yield is 24 grams or 58 percent. The product is characterized by a B.P. 72° C. at 58 mm. and $n_D^{23}$ 1.3920.

EXAMPLE 4

*Preparation of 2-Methyl-4,6-Divinyl-s-Triazine*

(A) *2,4-bis(1-acetoxyethyl) - 6 - methyl-s-triazine.*—A mixture of 75 parts (0.30 mole) of 2,4-bis-(1-chloroethyl)-6-methyl-s-triazine, obtained as a by-product in the preparation of 2-(1-chloroethyl)-4,6-dimethyl-s-triazine by reaction of ethylacetimidate with 2-chloropropionamidine hydrochloride, 61.5 parts (0.75 mole) of anhydrous sodium acetate, and 75 cc. of glacial acetic acid is refluxed for 20 hours. The reaction mixture is then cooled, diluted with water and benzene, and neutralized with sodium carbonate. The benzene solution is separated and dried over Drierite. Distillation affords 61.5 parts of the diacetate, B.P. 126° C. at 2.5 mm., $n_D^{28}$ 1.470.

(B) *2-methyl-4,6-divinyl-s-triazine.*—The pyrolysis of the diacetate was carried out in the manner and with the apparatus described for the preparation of 2,4-dimethyl-6-vinyl-s-triazine. At an observed temperature of 450–475° C. and at a flow rate of 0.6 gram per minute, conversion was approximately 65–75 percent. The crude pyrolyzate (29.5 g. from 37 g. of starting material) is stripped to separate an acetic acid 2-methyl-4,6-divinyl-s-triazine fraction. This fraction is then diluted with ether and washed with aqueous sodium carbonate. The ether solution is dried and distilled employing hydroquinone as an inhibitor. After evaporation of the ether, the crude reaction mixture was fractionally distilled to obtain 2-methyl-4,6-divinyl-s-triazine, B.P. 50–55° C. at 3 mm.

EXAMPLE 5

*Preparation of 2,4,6-Trivinyl-s-Triazine*

(A) *2,4,6-tris(1 - acetoxyethyl)-s-triazine.*—81.5 parts (0.30 mole) of 2,4,6-tris(1-chloroethyl)-s-triazine is heated with 94 parts (1.20 moles) of anyhdrous sodium acetate, 70 cc. of glacial acetic acid and 10 cc. of acetic anhydride for four hours at reflux. The cooled reaction mixture is extracted repeatedly with water, leaving oily crystals of the crude triacetate. The crude product is dissolved in ether and dried with calcium chloride. The ether is then evaporated. The product residue is crystallized from cyclohexane and has a M.P. of 83–84° C.

(B) *2,4,6-trivinyl-s-triazine.*—Pyrolysis of the triacetate is carried out in the manner described above for the preparation of 2,4-dimethyl-6-vinyl-s-triazine. However, because of the high melting point of the starting material, 46 grams of the compound is dissolved in 10 grams of warm glacial acetic acid and the solution is fed to the cracking column. The flow rate is about one gram of triacetate per minute. The pyrolyzate subsequently is distilled quickly yielding 5.5 grams, boiling point 57° C. at 4 mm., which appears to be crude 2,4,6-trivinyl-s-triazine. The crude product is dissolved in petroleum ether and neutralized with aqueous sodium carbonate. The petroleum ether solution is dried over calcium chloride and distilled to obtain product having a B.P. of 85° C./9 mm.–86° C./6 mm., F.P. 13° C.

EXAMPLE 6

*Homopolymerization*

POLYVINYLDIMETHYL-S-TRIAZINE (A) Crude 2,4-dimethyl-6-vinyl-s-triazine of Example 1 is purified by redistillation at 40° C. and 1 mm. in the presence of phenolic inhibitor such as t-butyl catechol or by absorption chromatography on an alumina column. Either procedure affords highly purified monomer which is employed in all of the subsequent examples.

A solution of 10 parts of the monomer in 100 parts of benzene is heated at 60–70° C. in the presence of 0.01 part of azo bis-isobutyronitrile for about 4 hours. The resultant viscous solution is futher diluted with benzene and led dropwise into petroleum ether. The resultant white, fibrous precipitate is dried in vacuo at 60° C. The polymer is further purified by re-dissolving in benzene and re-precipitating from petroleum ether. Alternatively, the benzene or water solutions may be freeze dried. One freeze dried sample is found to have an intrinsic viscosity of 1.6 and an average molecular weight exceeding one million. The polyvinyldimethyl-s-triazine polymer is soluble in water and in all common organic solvents with the exception of alphatic hydrocarbons.

Clear, hard, water-white films are obtained by pouring solutions of the homopolymer in each of three solvents, water, methanol, and benzene, on glass plates and heating in a forced draft oven at 60° C. for 120 minutes.

(B) Two parts of monomer in 10 parts of chlorobenzene are heated at 80° C. in the presence of 0.06 part of benzoyl peroxide for 23 hours to yield a viscous solution. The solution is led into petroleum ether and a 57 percent yield of dried, powdery polymer is obtained.

(C) One part of monomer in 10 parts of chlorobenzene solution is irradiated with X-rays for two hours to yield a viscous solution at room temperature. Precipitation from petroleum ether in the manner described above affords a 62% conversion of light yellow, powdery polymer. The polymer is soluble in all solvents except hexane or petroleum ether.

(D) To a deaerated water solution containing 100 parts of monomer is added 6 parts of $Na_2BrO_3$, sufficient sulfuric acid to lower the pH to 4, and finally 2 parts of solid $Na_2SO_3$ in an atmosphere of carbon dioxide. The redox system is allowed to stand at room temperature for a period of two hours, at which time a viscous solution results. After heating at 60–70° for a short period, the solution is neutralized with $NaHCO_3$ and stripped in vacuo. The gummy residue is extracted with hot benzene. The benzene extract is filtered and dropped into petroleum ether. A white, flocculent polymer is obtained.

EXAMPLE 7

*Copolymerization*

(A) Equal weights of 2,4-dimethyl-6-vinyl-s-triazine and acrylonitrile are heated at 42° C. for two and one-half hours in an inert atmosphere in the presence of a redox initiator. The powdery product, isolated by freeze drying from a water solution, readily absorbs dye when immersed and extracted from a 5 percent water solution of Calcocid Alizarine Blue. SAPG (Color Index 1054).

(B) A mixture of 6 parts of 2,4-dimethyl-6-vinyl-s-triazine and 4 parts of acrylonitrile is heated in a benzene solution at 60° C. in the presence of azobisisobutyronitrile for two hours. The resultant copolymer is isolated by adding the viscous solution to petroleum ether. The powdery product which is separated is found to be a copolymer of acrylonitrile and 2,4-dimethyl-6-vinyl-s-triazine and was soluble in water.

(C) The procedure of B is repeated, except that methylmethacrylate is substituted for the acrylonitrile employed therein. A water-soluble copolymer is obtained.

(D) Copolymerization of styrene and 2,4-dimethyl-6-vinyl-s-triazine as in B above yielded a copolymer which was molded at 1250 p.s.i. and 120° C. to a hard, opaque solid.

EXAMPLE 8

One part of a 1 percent aqueous solution of polyvinyl-dimethyl-s-triazine is heated with 1 part of benzene and the mixture shaken. An emulsion was formed indicating the anionic dispersing or emulsifying power of polyvinyl-dimethyl-s-triazine. When the emulsion is broken by cooling, both layers appeared to retain some of the other, indicating relatively stable emulsions of both the oil and water layers.

While all of the above described examples constitute various embodiments of the present invention further changes and modifications obviously may be made which do not constitute departure from the spirit and scope of the present invention as defined in the appended claims.

We claim:
1. 2,4-dimethyl-6-vinyl-s-triazine.
2. 2,4-bis(trifluoromethyl)-6-vinyl-s-triazine.
3. A process of preparing a compound of the structural formula

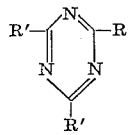

in which R is lower alkenyl and R′ is selected from the group consisting of lower alkenyl, lower alkyl and halogen substituted lower alkyl, which comprises pyrolyzing a corresponding (1-acetoxyalkyl) s-triazine at a temperature of from about 400° to about 525° C. and recovering the resultant compound.

4. A process of preparing 2,4-dimethyl-6-vinyl-s-triazine which comprises pyrolyzing 2-(1-acetoxyethyl)-4,6-dimethyl-s-triazine at a temperature of from about 400° to about 525° C. and recovering said s-triazine.

5. A process of preparing 2,4-bis-(trifluoromethyl)-6-vinyl-s-triazine which comprises pyrolyzing 2-(1-acetoxyethyl)-4,6-bis-(trifluoromethyl)-s-triazine at a temperature of from about 400° to about 525° C. and recovering said s-triazine.

6. A compound of the structural formula

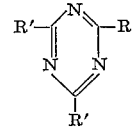

in which R is vinyl and R′ is selected from the group consisting of methyl and halogen substituted lower alkyl.

References Cited in the file of this patent

UNITED STATES PATENTS

| | | |
|---|---|---|
| 2,580,468 | Schaefer et al. | Jan. 1, 1952 |
| 2,634,990 | Ham | June 30, 1953 |
| 2,845,422 | Schaefer et al. | July 29, 1958 |
| 2,953,563 | Schaefer et al. | Sept. 20, 1960 |
| 3,047,532 | D'Alelio | July 31, 1962 |

FOREIGN PATENTS

| | | |
|---|---|---|
| 1,042,230 | Germany | Oct. 30, 1958 |

OTHER REFERENCES

Hechenbleikner: J. Am. Chem. Soc., vol. 76, p. 3022 (1954).

Reinhardt et al.: Chemische Berichte, vol. 90, pp. 2643–45 (1957).

Overberger et al.: Journ. of the Am. Chem. Soc., vol. 80, pp. 988–91 (1958).

Smolin et al.: "s-Triazines and Derivatives," pp. 11 to 12, 53 and 162 to 163, Interscience Publs., Inc. (February 1959).

UNITED STATES PATENT OFFICE
CERTIFICATE OF CORRECTION

Patent No. 3,163,647                                December 29, 1964

Frederic C. Schaefer et al.

It is hereby certified that error appears in the above numbered patent requiring correction and that the said Letters Patent should read as corrected below.

Column 2, lines 65 to 70, the right-hand portion of the formula should appear as shown below instead of as in the patent:

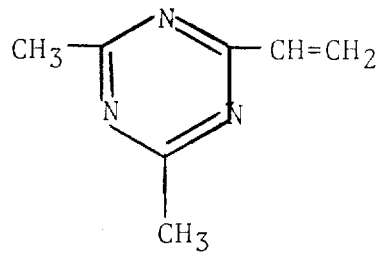

column 4, line 31, for "Radox" read -- Redox --.

Signed and sealed this 11th day of May 1965.

(SEAL)
Attest:

ERNEST W. SWIDER                              EDWARD J. BRENNER
Attesting Officer                             Commissioner of Patents